United States Patent
Barker et al.

(10) Patent No.: US 7,237,796 B2
(45) Date of Patent: Jul. 3, 2007

(54) ACTUATABLE LOCKING FASTENER

(75) Inventors: Kent Barker, Eden, UT (US); Mike Ayers, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 466 days.

(21) Appl. No.: 10/655,431

(22) Filed: Sep. 4, 2003

(65) Prior Publication Data

US 2005/0052000 A1 Mar. 10, 2005

(51) Int. Cl.
B60R 21/16 (2006.01)
(52) U.S. Cl. ...................... 280/728.2; 411/2
(58) Field of Classification Search ............ 280/743.1, 280/743.2, 728.2, 735; 411/2, 3, 5
See application file for complete search history.

(56) References Cited

U.S. PATENT DOCUMENTS

| | | | |
|---|---|---|---|
| 3,386,138 A | 6/1968 | Overman | |
| 3,605,199 A | 9/1971 | Eberhardt | |
| 3,949,449 A | 4/1976 | Caveney et al. | |
| 5,695,214 A | 12/1997 | Faigle et al. | |
| 5,997,230 A | 12/1999 | Dodd et al. | |
| 6,616,184 B2 * | 9/2003 | Fischer | 280/743.2 |
| 6,659,499 B2 * | 12/2003 | Jenkins | 280/735 |
| 2002/0043790 A1 | 4/2002 | Elqadah et al. | |
| 2003/0107207 A1 * | 6/2003 | Elqadah et al. | 280/735 |
| 2005/0057027 A1 * | 3/2005 | Fogle et al. | 280/739 |

\* cited by examiner

*Primary Examiner*—Faye M. Fleming
(74) *Attorney, Agent, or Firm*—Sally J Brown; Madson & Austin

(57) ABSTRACT

An actuatable fastener assembly is disclosed. The actuatable fastener assembly includes a fastener body and a fastener head attached to the fastener body. An initiator is embedded within the fastener body. Activation of the initiator causes the fastener head to separate from the fastener body. The actuatable fastener assembly also includes a retainer that is slidably movable along the fastener body toward the fastener head. The retainer includes a retention feature that resists movement of the retainer away from the fastener head.

26 Claims, 18 Drawing Sheets

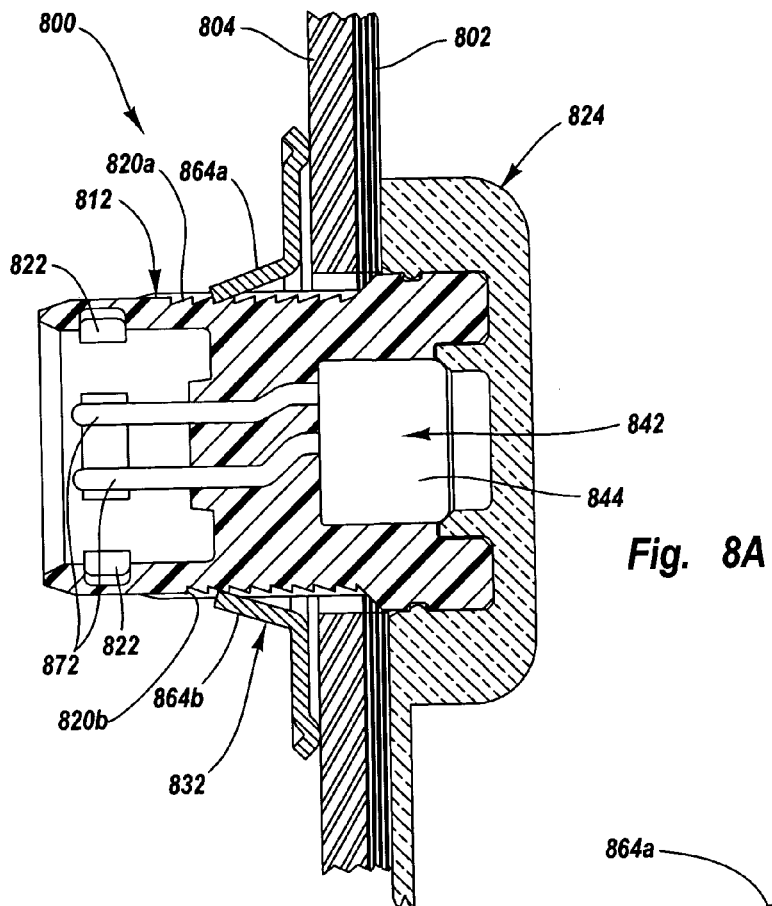
*Fig. 8A*
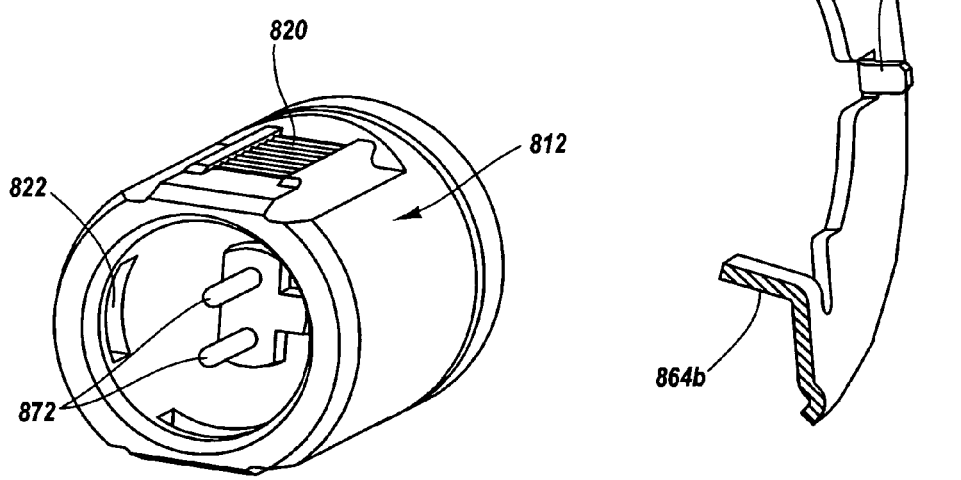
*Fig. 8B*
*Fig. 8C*

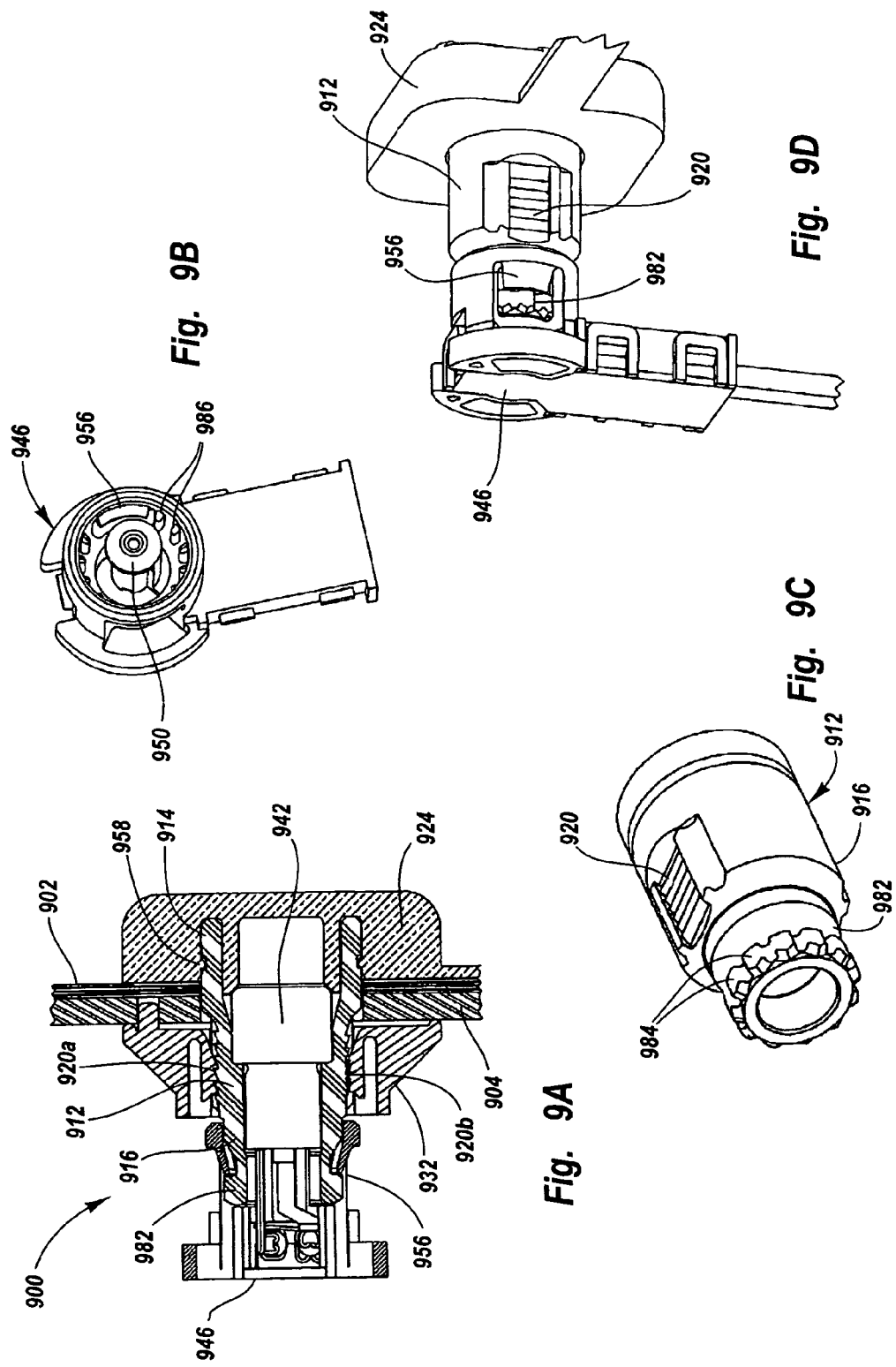

ACTUATABLE LOCKING FASTENER

BACKGROUND OF THE INVENTION

1. Field of the Invention

The present invention relates to actuatable fasteners. More specifically, the present invention relates to retention mechanisms for actuatable fasteners that may be used to releasably fasten objects together.

2. Description of Related Art

Actuatable fasteners, such as exploding bolts, are often used to releasably fasten together objects that may need to become unfastened under certain circumstances. Such actuatable fasteners are generally shaped like standard male fasteners, with an elongated fastener body extending from an attached fastener head. Ordinarily, some type of explosive is contained within the fastener body or the fastener head. When the fastened objects are to become unfastened, the explosive is ignited. The resulting explosion causes the fastener head to separate from the fastener body, permitting the fastened objects to become unfastened.

One situation where actuatable fasteners may be used is in connection with airbag systems. Typical airbag systems include an inflatable cushion contained within a housing and an activation device which is configured to sense a collision through the use of a collision sensor, such as a piezoelectric accelerometer. The activation device may utilize acceleration data, alone or in combination with other data, to determine whether the inflatable cushion should be inflated. The activation device may also detect other relevant metrics, such as the impact velocity, occupant weight, occupant position, and the like through the use of additional sensors. These metrics may be used to determine the desired stiffness of the inflatable cushion, which may be adjusted through the use of one or more venting tubes. A venting tube generally extends from the inflatable cushion and is attached to and compressed against the airbag housing by an actuatable fastener.

When an actuatable fastener is used in this manner, the fastener is generally positioned so that the venting tube is compressed between the fastener head and the airbag housing. In this configuration, the venting tube is "closed;" namely, gas from the inflatable cushion is substantially prevented from flowing through the venting tube. When the actuatable fastener is actuated (i.e., when the fastener head separates from the fastener body), the venting tube moves to an "open" configuration and inflation gas can flow out of the inflatable cushion through the venting tube. If the activation device determines that the stiffness of the inflatable cushion should be reduced, the activation device typically sends an activation signal to the actuatable fastener, causing the actuatable fastener to be actuated.

Some type of retention mechanism is generally used to retain an actuatable fastener in a particular location. In the airbag example discussed above, the retention mechanism is generally used to keep the fastener in a position where the venting tube is compressed between the fastener head and the airbag housing, so that the venting tube is maintained in a closed position.

One example of a known retention mechanism is an internally threaded female fastener, such as a nut. With such a retention mechanism, the fastener body is generally manufactured with external threads that mate with the internal threads in the female fastener. To retain the actuatable fastener in a desired position on the airbag housing, the fastener body is generally inserted through a hole in the venting tube and a hole in the airbag housing. The female fastener is then screwed onto the fastener body on the side of the airbag housing opposite the fastener head, and tightened until the fastener is held in place.

Unfortunately, such a retention mechanism requires the use of parts that have been machined to include threads. Machined parts are typically more expensive to produce than parts that are not machined. Moreover, it takes a considerable amount of time to screw the female fastener onto the fastener body, making this type of retention mechanism quite labor intensive. Accordingly, a need exists for a retention mechanism for an actuatable fastener that is less costly to produce and that is easier to install than presently available retention mechanisms.

SUMMARY OF THE INVENTION

The apparatus of the present invention has been developed in response to the present state of the art, and in particular, in response to the problems and needs in the art that have not yet been fully solved by currently available actuatable fasteners. Thus, an actuatable fastener assembly is disclosed. The actuatable fastener assembly may include a fastener body and a fastener head attached to the fastener body. An initiator may be embedded within the fastener body. Activation of the initiator may cause the fastener head to separate from the fastener body. The actuatable fastener assembly may also include a retainer that is slidably movable along the fastener body toward the fastener head. The retainer may include a retention feature that resists movement of the retainer away from the fastener head.

Many different types of retention features may be included in the retainer. For example, the retention feature in the retainer may take the form of a plurality of locking teeth. The locking teeth in the retainer may engage locking teeth positioned on an exterior surface of the fastener body in order to resist movement of the retainer away from the fastener head. Alternatively, the retention feature in the retainer may take the form of a locking tab that points away from the fastener head. To resist movement of the retainer away from the fastener head, the locking tab may engage locking teeth positioned on the fastener body. Alternatively, the locking tab may frictionally engage an exterior surface of the fastener body. In some embodiments, the exterior surface of the fastener body may have two sets of locking teeth that are offset from one another to provide finer positional adjustment of the retainer.

The actuatable fastener assembly may include a connector. The connector may be positioned within the fastener body so that a terminal in the connector mates with a pin in the initiator. The connector may include a locking tab that snaps into a retention pocket in the fastener body in order to secure the connector to the fastener body. The connector is typically used to place the initiator in electronic communication with an activation device.

Alternatively, a retaining ring may be attached to the fastener body, and the connector may be attached to the retaining ring. The retaining ring may include a plurality of radially disposed splines, and an interior portion of the connector may include a plurality of radially disposed ribs that interact with the splines in order to prevent rotation of the retaining ring relative to the connector. The splines may interfere with a locking tab in the connector to prevent movement of the connector away from the fastener head.

A tether may be attached to the fastener head. The tether may perform the function of retaining the fastener head after the initiator has discharged. The tether may be attachable to the retainer. In some embodiments, the fastener head, the retainer, and the tether are formed as a single unit.

The fastener head may be directly attached to the fastener body. For example, the fastener head may snap into the fastener body. Alternatively, the fastener head may be ultrasonically welded to the fastener body. In some embodiments, a groove may extend through a welded area between the fastener head and the fastener body in order to make it easier for the fastener head to separate from the fastener body.

Alternatively, the fastener head may be attached to the fastener body via a coupling member. The connection between the fastener head and the coupling member may be more easily severed than the connection between the fastener body and the coupling member.

The initiator may be held in place by means of a press-fit between a bore in the fastener body and the initiator. Alternatively, the fastener body may be manufactured with the initiator in place. In some embodiments, the initiator includes a shorting bar extending from one or more pins in the initiator.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 8A is a cross-sectional view of another alternative embodiment of the actuatable fastener assembly;

FIG. 8B is a perspective view of the fastener body shown in FIG. 8A;

FIG. 8C is a cut-away, perspective view of the retainer shown in FIG. 8A;

FIG. 9A is a cross-sectional view of another alternative embodiment of an actuatable fastener assembly;

FIG. 9B is a perspective view illustrating the connector of FIG. 9A;

FIG. 9C is a perspective view illustrating the fastener body and retaining ring of FIG. 9A;

FIG. 9D is a perspective view of the actuatable fastener assembly of FIG. 9A with the retaining ring shown holding the connector in place;

DETAILED DESCRIPTION

It will be readily understood that the components of the present invention, as generally described and illustrated in the Figures herein, could be arranged and designed in a wide variety of different configurations. Thus, the following more detailed description of several exemplary embodiments of the present invention, as represented in FIGS. 1 through 17, is not intended to limit the scope of the invention, as claimed, but is merely representative of the embodiments of the invention.

The different actuatable fastener assemblies that are disclosed herein are all described as being used to open and close a venting tube in an airbag system. However, the disclosed actuatable fastener assemblies may be used for a variety of different purposes in connection with a wide variety of different systems, such as fire suppression systems, aerospace systems, and the like.

Figure 1:
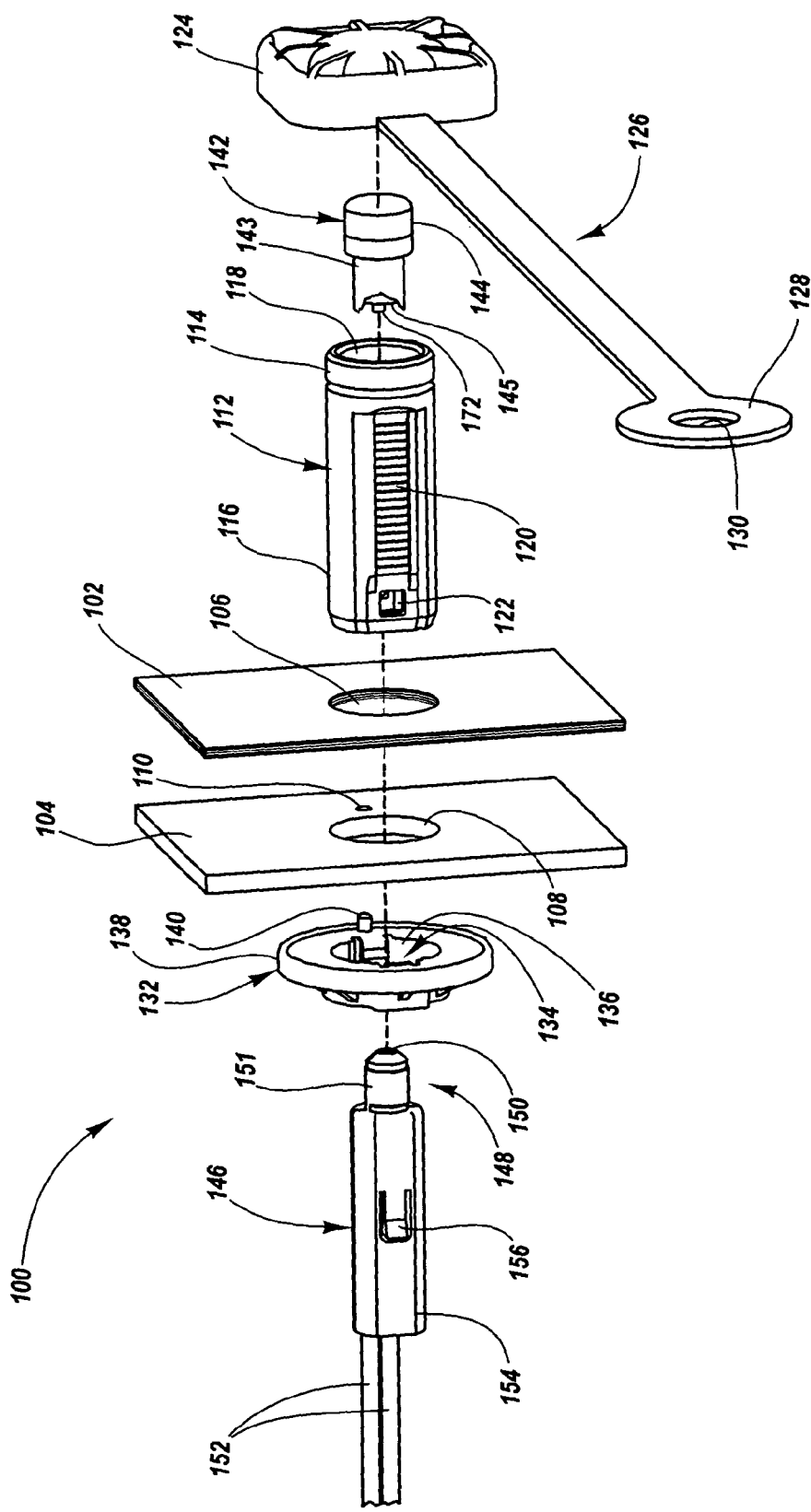
FIG. 1 is an exploded view of an embodiment of an actuatable fastener assembly that may be used to releasably secure a venting tube in an airbag system to an airbag housing.

FIG. 1 is an exploded view of an embodiment of an actuatable fastener assembly 100 that may be used to releasably secure a venting tube 102 in an airbag system to an airbag housing 104. For clarity, only a portion of the venting tube 102 and a portion of the airbag housing 104 are shown. The venting tube includes a hole 106 which will be referred to as a venting tube hole 106. The airbag housing 104 includes a hole 108 which will be referred to as a housing hole 108. The airbag housing 104 also includes a pinhole 110.

The actuatable fastener assembly 100 includes a fastener body 112 which, as shown, is elongated and substantially cylindrical in shape, with a first end portion 114 and a second end portion 116. A bore 118 extends along the length of the fastener body 112. The cross-sectional area of the fastener body 112 (taken perpendicular to the length of the fastener body 112) is somewhat smaller than the holes 106, 108 in the venting tube 102 and airbag housing 104, respectively. Locking teeth 120 are positioned on the exterior surface of the fastener body 112. The fastener body 112 also includes a retention pocket 122.

A fastener head 124 is also provided. The fastener head 124 is somewhat larger than the venting tube hole 106 and the housing hole 108. A tether 126 is attached to the fastener head 124. The tether 126 has a generally elongated shape. An end portion 128 of the tether 126 includes an attachment hole 130.

The actuatable fastener assembly 100 also includes a retainer 132. As shown, the retainer 132 has a generally rounded shape. A hole 134 extends through the middle of the retainer 132, the hole 134 being bounded by an unthreaded interior wall 136. The diameter of the hole 134 is slightly larger than the diameter of the fastener body 112. Although they are not visible in FIG. 1, the retainer 132 includes several retention features, which will be described in greater detail below. The retainer 132 also includes a flexing rib 138 that is radially disposed around the peripheral region of the retainer 132 and an alignment pin 140.

An initiator 142 is also provided. The initiator 142 has an initiator head 144 and an initiator body 143. A pyrotechnic is contained within the initiator head 144. Upon receipt of an activation signal, the pyrotechnic ignites, causing the initiator head 144 to fracture and release pressurized gas and heat. A socket 145 is provided in the initiator body 143. A pin 172 is positioned inside the socket 145.

The actuatable fastener assembly 100 also includes a connector 146. A first end portion 148 of the connector 146 includes two terminals 150, 151. Activation wires 152 extend from a second end portion 154 of the connector 146. An exterior surface of the connector 146 includes an outwardly projecting locking tab 156.

Figure 2:
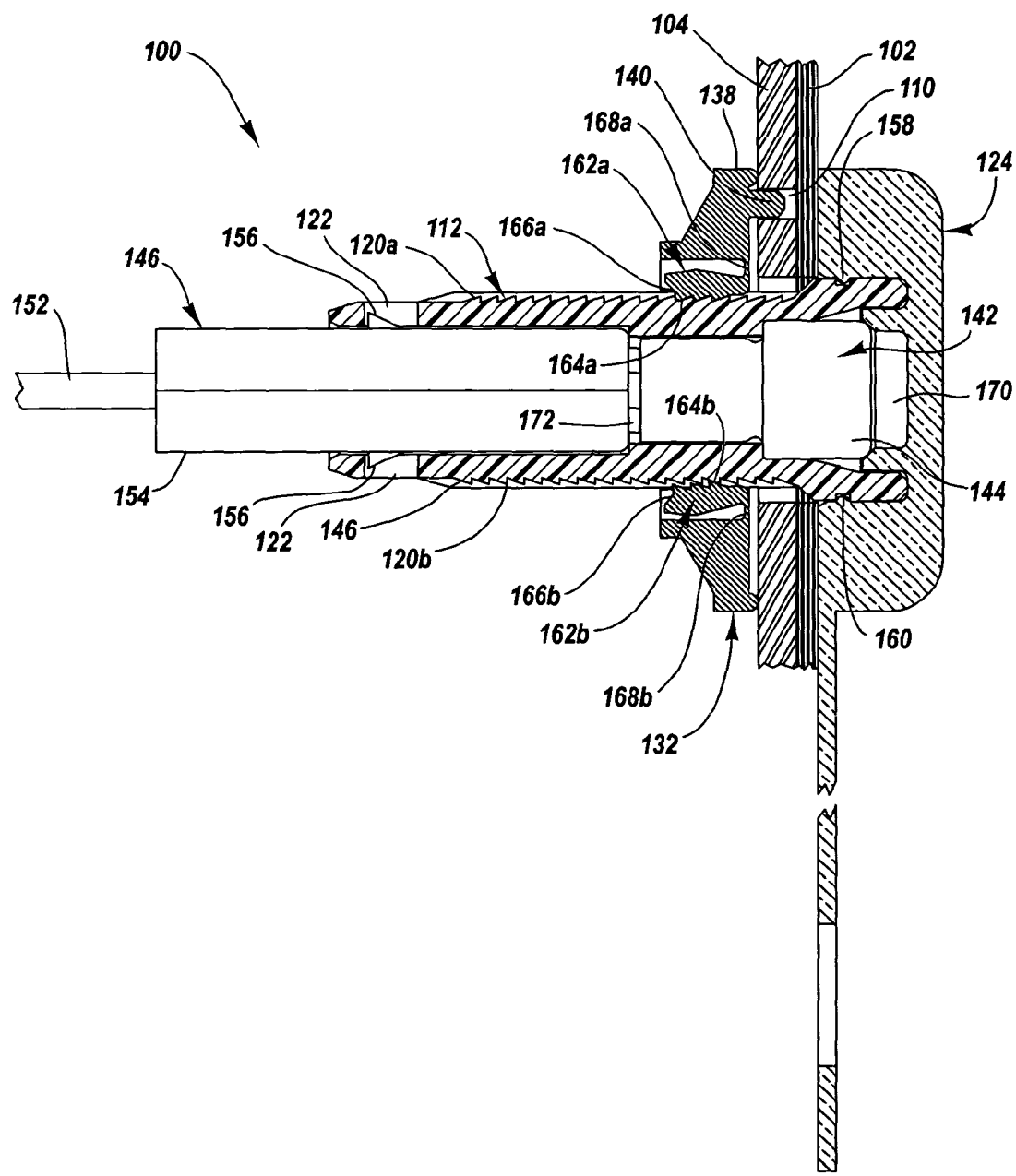
FIG. 2 is a cross-sectional view of the actuatable fastener assembly of FIG. 1 in its assembled state.

FIG. 2 is a cross-sectional view of the actuatable fastener assembly 100 of FIG. 1 in its assembled state. The fastener body 112 is directly attached to the fastener head 124. More specifically, a radial attachment rib 158 in the fastener head 124 extends into a radial groove 160 in the fastener body 112. The fastener head 124 may be attached to the fastener body 112 in other ways, such as ultrasonic welding.

The fastener body 112 extends through the hole 106 in the venting tube 102 and the hole 108 in the airbag housing 104. The fastener head 124 is positioned so that the venting tube 102 is in a closed position, i.e., so that the venting tube 102 is tightly compressed between the fastener head 124 and the airbag housing 104.

The retainer 132 is positioned around the fastener body 112, in abutting relation to the airbag housing 104. The retainer 132 includes a pair of pawls 162, namely an upper pawl 162a and a lower pawl 162b. Each pawl 162 includes retention features 164, and more specifically, a plurality of locking teeth 164. In particular, the upper pawl 162a includes upper locking teeth 164a, and the lower pawl 162b includes lower locking teeth 164b. These locking teeth 164 interact with the locking teeth 120 on the surface of the fastener body 112 in order to resist movement of the retainer 132 away from the fastener head 124, and vice versa. In other words, the retainer 132 locks the fastener assembly 100 in place so that the venting tube 102 remains in a closed position. Beveled portions 166a, 166b on the pawls 162a, 162b allow the retainer 132 to be removed from the fastener body 112.

Each pawl 162 is connected to the rest of the retainer 132 by a hinge 168. The hinge 168 is sufficiently thin so that the pawl 162 is allowed to rotate. Rotation of the pawls 162 permits the retainer 132 to be moved toward the fastener head 124 without the locking teeth 164 on the pawls 162 in the retainer 132 and the locking teeth 120 on the surface of the fastener body 112 interfering with one another. Therefore, attachment of the retainer 132 to the fastener body 112 may be accomplished by simply sliding the retainer 132 along the fastener body 112 toward the fastener head 124. As a result, attachment of the retainer 132 to the fastener assembly 100 may occur with a minimum of time and expense.

Two sets of locking teeth 120 are shown positioned on the exterior surface of the fastener body 112, upper locking teeth 120a and lower locking teeth 120b. The upper locking teeth 120a are offset by one-half pitch from the lower locking teeth 120b. This allows for finer adjustment of the position of the retainer 132 on the fastener body 112.

The flexing rib 138 in the retainer 132 is shown in abutting relation to the airbag housing 104. The flexing rib 138 allows the retainer 132 to flex and take up slack so that the retainer 132 may be tightly pressed against the airbag housing 104. The alignment pin 140 in the retainer 132 extends through the pinhole 110 in the airbag housing 104 in order to resist rotation of the retainer 132 relative to the airbag housing 104.

The initiator 142 is embedded within the bore 118 in the fastener body 112 and located near the first end portion 114 of the fastener body 112. The initiator head 144 is in alignment with an expansion space 170 in the fastener head 124. The expansion space 170 allows the initiator head 144 to open after the initiator 142 has discharged. The initiator 142 is held in place by means of a press-fit between the bore 118 and the initiator head 144. Alternatively, the fastener body 112 may be manufactured with the initiator 142 in place.

A pin 172 extends from the initiator 142. The initiator 142 in the illustrated embodiment includes a single pin 172. However, initiators with more than one pin may be used. The connector 146 is positioned within the bore 118 near the second end portion 116 of the fastener body 112, so that the terminal 150 connects to the pin 172 and the terminal 151 connects to the inside surface of the socket 145. The activation wires 152 that extend from the second end portion 154 of the connector 146 are directed to an activation device, so that the initiator 142, via the pin 172, is placed in electrical communication with the activation device. The locking tabs 156 on the surface of the connector 146 extend through the connector retention pockets 122 on the fastener body 112 to secure the connector 146 to the fastener body 112.

The operation of the actuatable fastener assembly 100 will now be described. When the activation device determines that the stiffness of the inflatable cushion needs to be reduced, the activation device sends an activation signal to the initiator 142 via the connector 146. This causes the initiator 142 to discharge, so that pressurized gas and heat are directed into the expansion space 170 in the fastener head 124. As a result, the pressure within the expansion space 170 increases significantly, causing the fastener head 124 to separate from the fastener body 112. The venting tube 102 is then free to open, so that inflation gases can flow out of the inflatable cushion through the venting tube 102 in order to reduce the stiffness of the inflatable cushion.

The tether 126 may be used to secure the fastener head 124 to a stationary object, such as the airbag housing 104, so that the fastener head 124 does not strike a vehicle occupant or other vehicle components after separating from the fastener body 112. This will be described in greater detail below.

Figure 3:
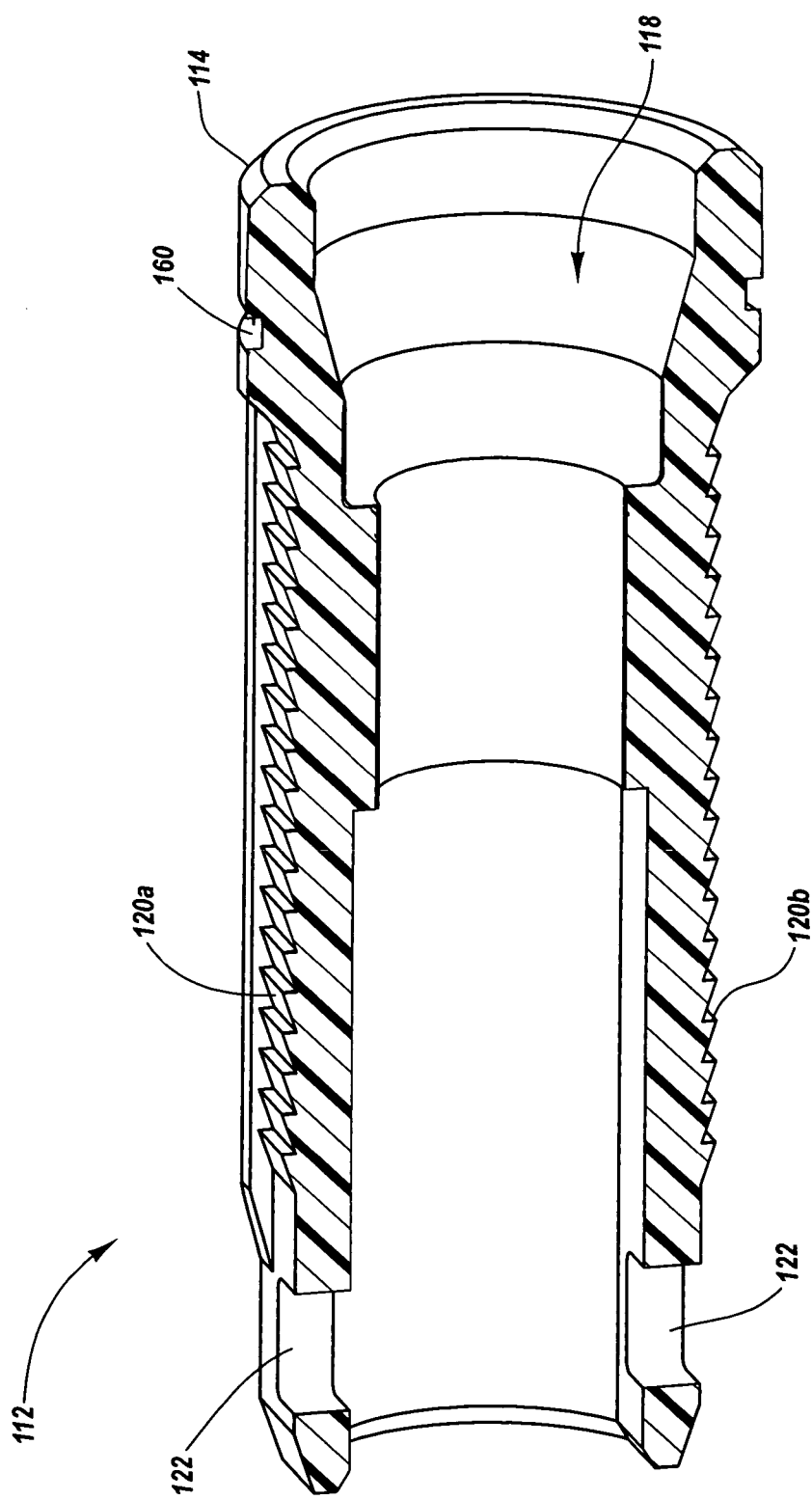
FIG. 3 is a cross-sectional view of the fastener body shown in FIGS. 1 and 2.

FIG. 3 is a cross-sectional view of the fastener body 112 shown in FIGS. 1 and 2. The bore 118 which extends along the length of the fastener body 112 is shown. As described above, the bore 118 is dimensioned so that the initiator 142 may be embedded therein.

Both the upper locking teeth 120*a* and the lower locking teeth 120*b* are also shown. As described above, the locking teeth 120 on the surface of the fastener body 112 engage the locking teeth 164 on the pawls 162 of the retainer 132 to resist movement of the fastener head 124 away from the retainer 132, and vice versa.

The radial groove 160 positioned near the first end portion 114 of the fastener body 112 is also shown. As described above, the fastener head 124 snaps into this groove 160 in order to attach the fastener head 124 to the fastener body 112.

Retention pockets 122 are also shown. As described above ,locking tabs 156 on the connector 146 snap into the retention pockets 122 in order to secure the connector 146 to the fastener body 112.

Figure 4:
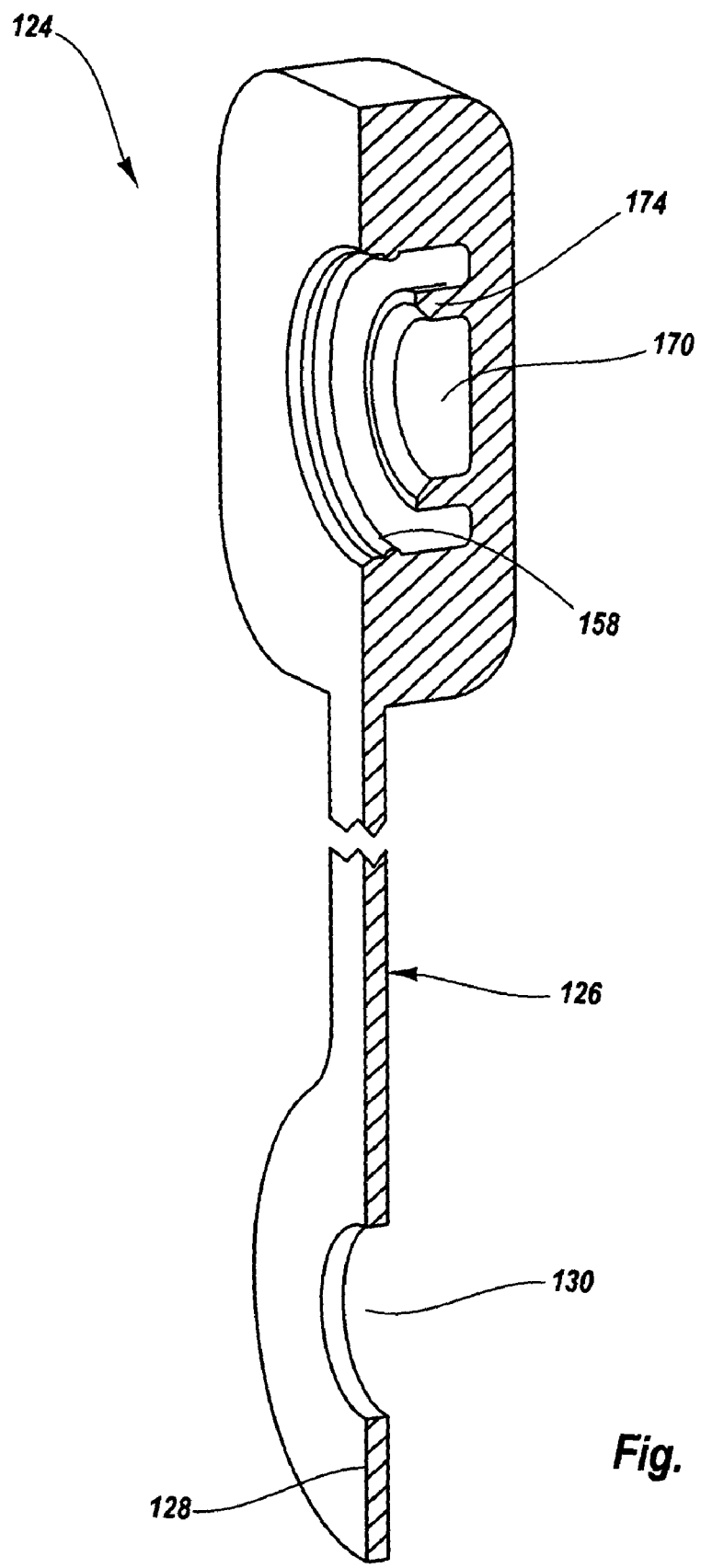
FIG. 4 is a cut-away, perspective view of the fastener head shown in FIGS. 1 and 2.

FIG. 4 is a cut-away, perspective view of the fastener head 124 shown in FIGS. 1 and 2. The radial attachment rib 158 is shown. As described above, the radial attachment rib 158 snaps into the radial groove 160 in the fastener body 112 in order to attach the fastener head 124 to the fastener body 112.

The expansion space 170 in the fastener head 124 is also shown. As described above, the expansion space 170 allows the initiator head 144 to open after the initiator 142 has discharged. A locating rib 174 surrounds the expansion space 170. The locating rib 174 prevents axial movement of the initiator 142 prior to deployment.

The tether 126 is also shown. As described above, the tether 126 performs the function of retaining the fastener head 124 after the initiator 142 has been triggered. The attachment hole 130 in the end portion 128 of the tether 126 may be used to attach the tether 126 to the airbag housing 104 and/or the retainer 132 (or some other object).

Figure 5:
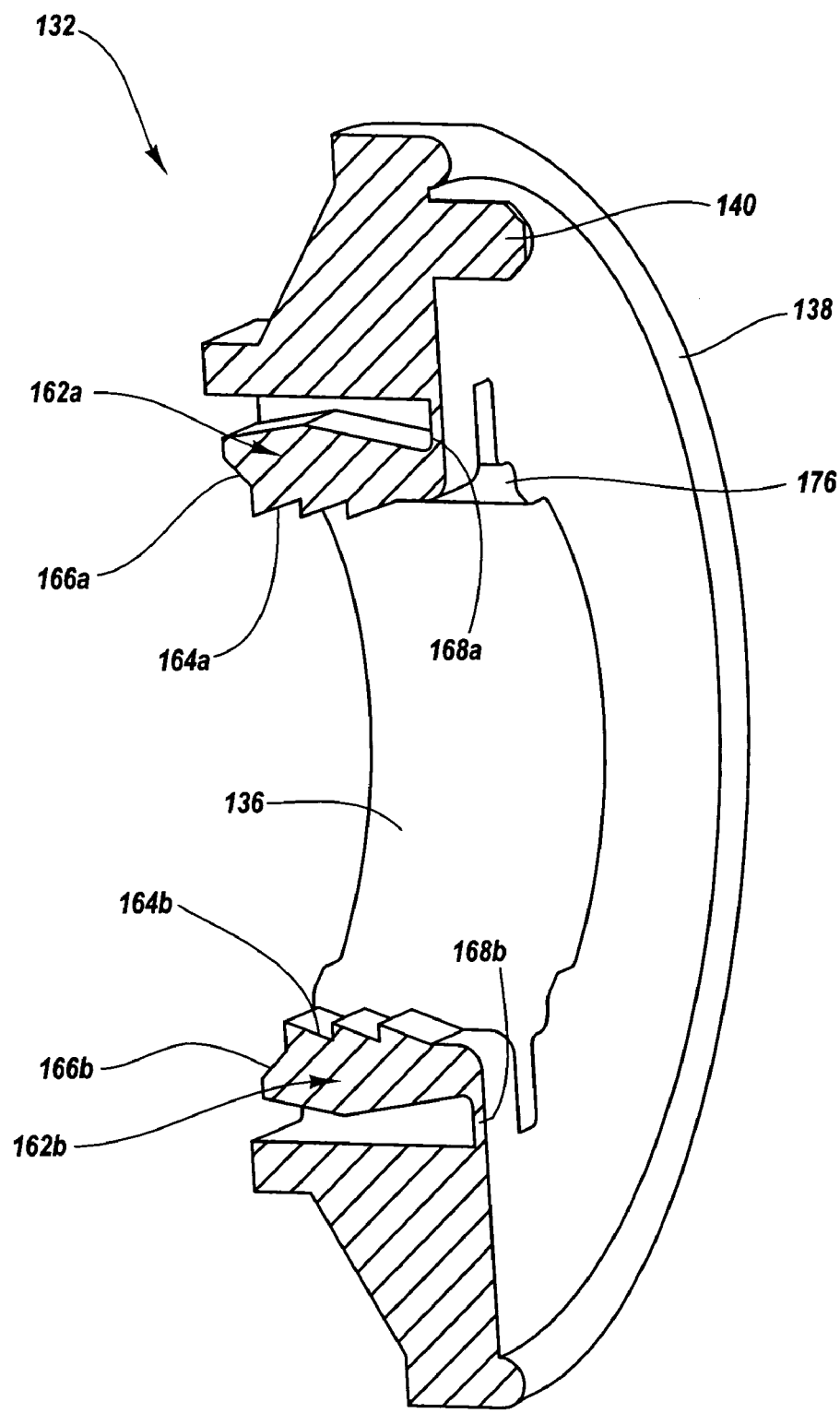
FIG. 5 is a cut-away, perspective view of the retainer shown in FIGS. 1 and 2.

FIG. 5 is a cut-away, perspective view of the retainer 132 shown in FIGS. 1 and 2. The upper pawl 162*a* and the lower pawl 162*b* are shown, along with the upper locking teeth 164*a* in the upper pawl 162*a* and the lower locking teeth 164*b* in the lower pawl 162*b*. As described above, the locking teeth 164 in at least one of the pawls 162 engage the locking teeth 120 on the surface of the fastener body 112 in order to resist movement of the fastener head 124 away from the retainer 132 and movement of the retainer 132 away from the fastener head 124.

The hinges 168 that connect the pawls 162 to the rest of the retainer 132 are also shown. As described above, each hinge 168 is sufficiently thin so that the pawl 162 is allowed to rotate. This allows the retainer 132 to be moved along the fastener body 112 toward the fastener head 124 without the locking teeth 164 in the retainer 132 and the locking teeth 120 on the fastener body 112 interfering with each other. The beveled portions 166 of each of the pawls 162 are also shown. As described above, the beveled portions 166 allow the retainer 132 to be removed from the fastener body 112.

The flexing rib 138 is also shown. The flexing rib 138 allows the retainer 132 to flex and take up slack so that the retainer 132 may be tightly pressed against the airbag housing 104. The alignment pin 140 is also shown. The alignment pin 140 is dimensioned to be inserted into the pinhole 110 in the airbag housing 104 in order to resist rotation of the retainer 132 relative to the airbag housing 104.

An alignment rib 176 is also shown in FIG. 5. The alignment rib 176 extends linearly along the interior wall 136 of the retainer 132. The alignment rib 176 fits in a mating groove in the fastener body 112 when the retainer 132 is attached to the fastener body 112.

Figure 6A:
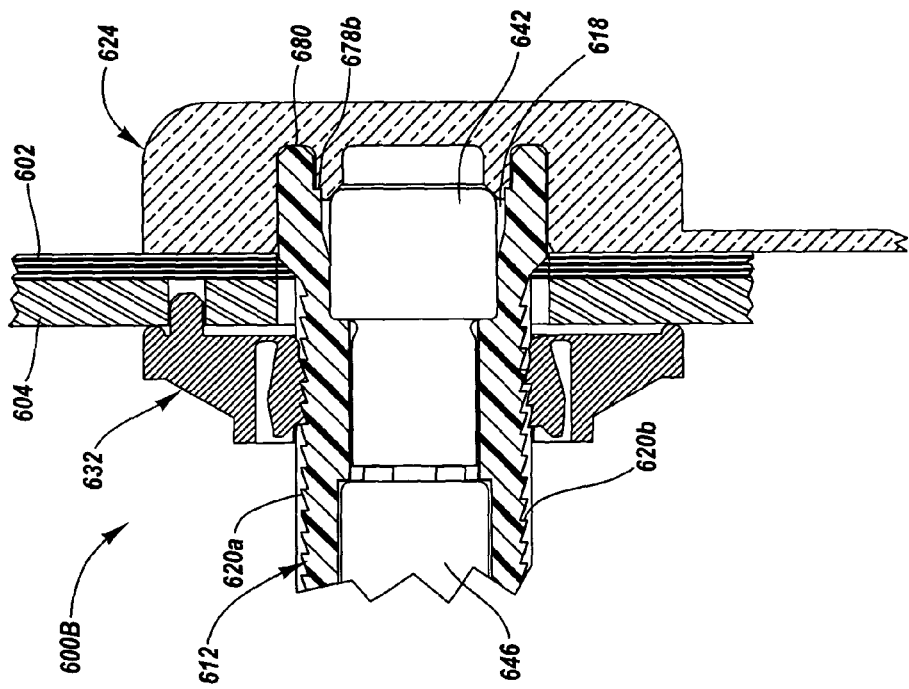
FIG. 6A is a cross-sectional view of an alternative embodiment of the actuatable fastener assembly.
Figure 6B:
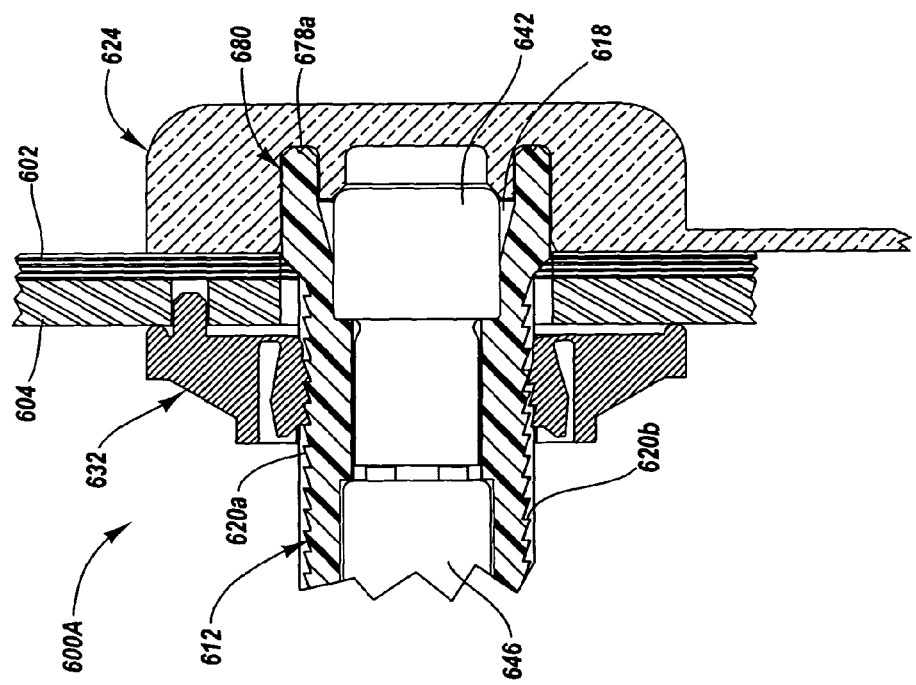
FIG. 6B is a cross-sectional view of another alternative embodiment of the actuatable fastener assembly.

FIGS. 6A and 6B are cross-sectional views of alternative embodiments of the actuatable fastener assembly 600. Many of the components in the assembly 600 shown in FIGS. 6A and 6B are similar to components shown in previous Figures and described in connection therewith. As will be the case throughout this description, such components will be labeled with corresponding reference numbers, but the textual description of such components will not be repeated.

In the embodiments shown in FIGS. 6A and 6B, the fastener body 612 is ultrasonically welded to the fastener head 624. In FIG. 6A, the welded area 678*a* is located between a rim 680 of the fastener body 612 and the fastener head 624. In FIG. 6B, the welded area 678*b* is located between a portion of the bore 618 within the fastener body 612 and the fastener head 624.

Figure 7:
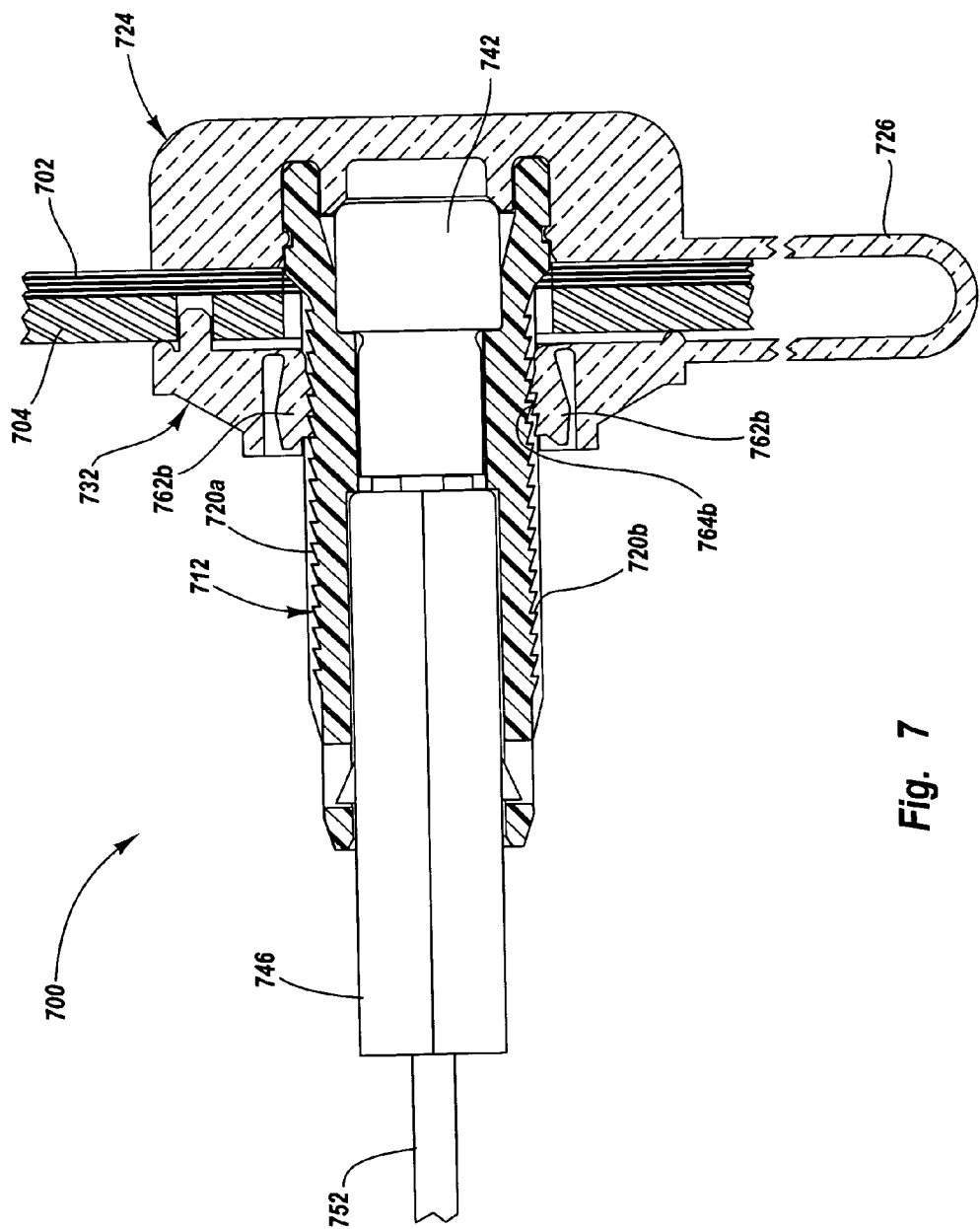
FIG. 7 is a cross-sectional view of another alternative embodiment of the actuatable fastener assembly.

FIG. 7 is a cross-sectional view of an embodiment of the actuatable fastener assembly 700 in which the fastener head 724, the tether 726, and the retainer 732 are formed as a single unit. The tether 726 is U-shaped, and extends in a curved manner around the venting tube 702 and the airbag housing 704 between the fastener head 724 and the retainer 732. In this configuration, the tether 726 performs the function of retaining the fastener head 724 after it 724 has separated from the fastener body 712. FIG. 8A is a cross-sectional view of an alternative embodiment of the actuatable fastener assembly 800. The retention features 864 in the retainer 832 shown in FIG. 8A are a pair of locking tabs 864, namely an upper locking tab 864*a* and a lower locking tab 864*b*. The locking tabs 864 point away from the fastener head 824, so that the retainer 832 may be moved, slidably, along the fastener body 812 toward the fastener head 824 to attach the retainer 832 to the fastener body 812. When the retainer 832 is attached to the fastener body 812, the locking tabs 864 engage the locking teeth 820 on the surface of the fastener body 812. This restricts movement of the fastener head 824 away from the retainer 832, and vice versa. The retainer 832 may be made out of metal, and the locking tabs 864 may be stamped into the retainer 832.

As before, the initiator 842 is embedded within the fastener body 812. In the illustrated embodiment, the fastener body 812 is manufactured with the initiator 842 in place. For example, the fastener body 812 may be made out of plastic and formed from a mold. The initiator 842 may be inserted into the mold prior to entry of plastic. The initiator 842 may be held in place within the mold while flowable plastic is injected or otherwise inserted into the mold. The plastic generally surrounds the initiator 842, thus effectively capturing the initiator 842. The initiator 842 shown in FIG. 8 includes two pins 872. Of course, an initiator having only a single pin may also be used.

The fastener body 812 shown in FIG. 8A includes a plurality of retention pockets 822. Each retention pocket 822 is configured to receive a locking tab on a connector in order to secure the connector to the fastener body 812.

FIG. 8B is a perspective view of the fastener body 812 shown in FIG. 8A. The pins 872 are shown extending from the initiator 842. The locking teeth 820 on the exterior surface of the fastener body 812 and the retention pockets 822 are also shown.

FIG. 8C is a cut-away, perspective view of the retainer 832 shown in FIG. 8A. The locking tabs 864 are shown protruding at an obtuse angle to the rest of the retainer 832. The alignment tab 840 is also shown.

FIG. 9A is a cross-sectional view of another alternative embodiment of an actuatable fastener assembly 900. In the illustrated embodiment, a retaining ring 982 is attached to the second end portion 916 of the fastener body 912. The retaining ring 982 includes a plurality of radially disposed splines 984. A connector 946 is attached to the retaining ring 982. The connector 946 includes an inwardly projecting locking tab 956.

FIG. 9B is a perspective view illustrating the connector 946 of FIG. 9A. The connector 946 includes a plurality of ribs 986. The ribs 986 are radially disposed around an interior portion of the connector 946. A terminal 950 is shown extending through the interior portion of the connector 946. The locking tab 956 is also shown.

FIG. 9C is a perspective view illustrating the fastener body 912 and retaining ring 982 of FIG. 9A. The teeth 920 on the exterior surface of the fastener body 912 are also shown. The retaining ring 982 is shown attached to the second end portion 916 of the fastener body 912. The radially disposed splines 984 are also shown.

FIG. 9D is a perspective view of the actuatable fastener assembly 900 of FIG. 9A with the retaining ring 982 shown holding the connector 946 in place. The splines 984 on the retaining ring 982 interact with the ribs 986 in the connector 946 to prevent rotation of the connector 946 relative to the retaining ring 982. The splines 984 interfere with the inwardly projecting locking tab 956 to prevent movement of the connector 946 away from the fastener head 924.

Figure 10:
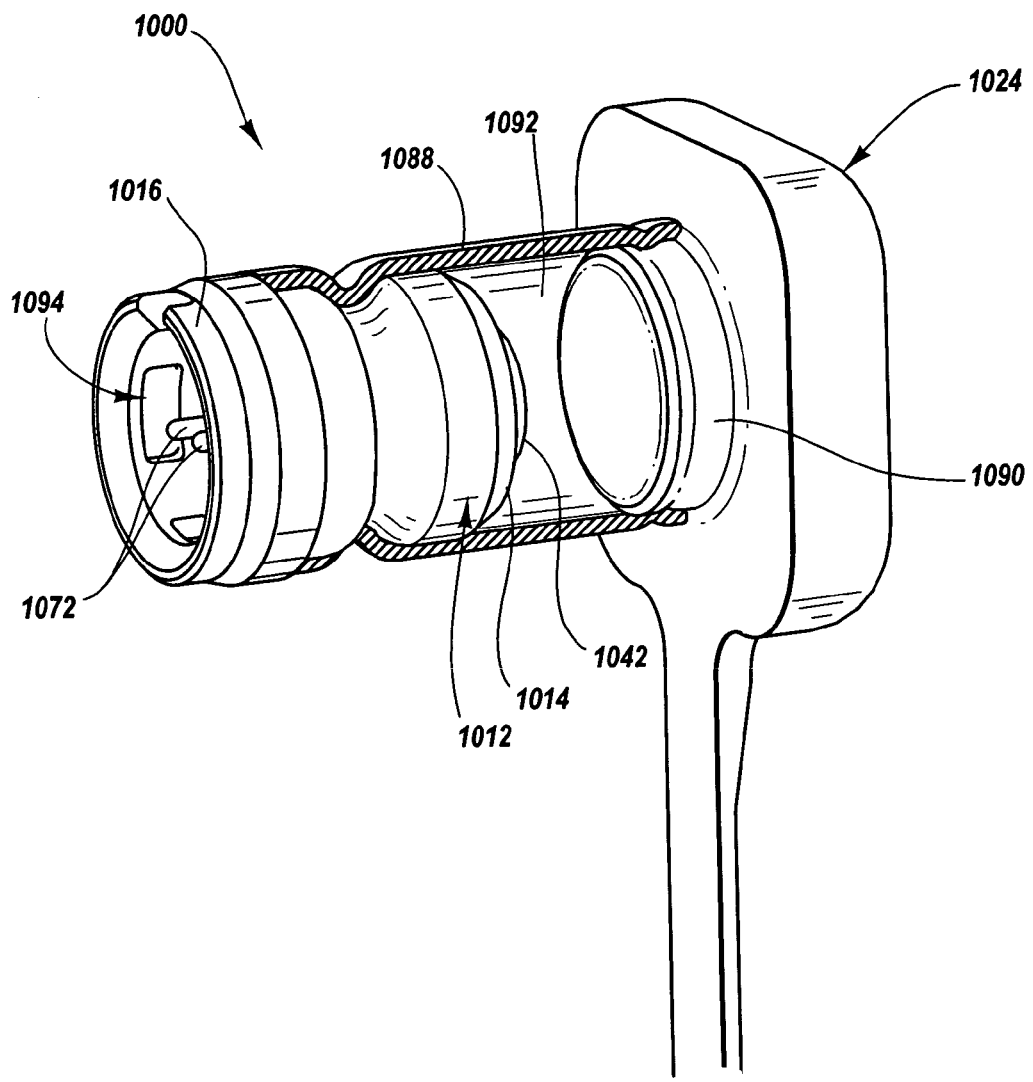
FIG. 10 is a perspective view of another alternative embodiment of an actuatable fastener assembly.

FIG. 10 is a perspective view of another alternative embodiment of the actuatable fastener assembly 1000. The actuatable fastener assembly 1000 includes a coupling member 1088, which facilitates attachment of the fastener body 1012 to the fastener head 1024. The coupling member 1088 shown in FIG. 10 is a cylindrical, metal tube. The coupling member 1088 is crimped at one end to the fastener body 1012 and at another end to a protrusion 1090 extending from the fastener head 1024. The coupling member 1088 encloses a volume 1092 between the fastener body 1012 and the fastener head 1024.

The connection between the fastener head 1024 and the coupling member 1088 is more easily severed than the connection between the fastener body 1012 and the coupling member 1088. More specifically, the coupling member 1088 is crimped more forcefully to the fastener body 1012 than to the protrusion 1090 in the fastener head 1024. Thus, there is a relatively strong connection between the fastener body 1012 and the coupling member 1088, and a relatively weak connection between the coupling member 1088 and the fastener head 1024.

The initiator 1042 is embedded within the fastener body 1012 and positioned near its first end portion 1014. In the illustrated embodiment, the initiator 1042 is insert-molded into the fastener body 1012. However, the initiator 1042 may alternatively be inserted into the fastener body 1012 and held in place by means of a press-fit. The initiator 1042 shown in FIG. 10 includes two pins 1072. An initiator having only a single pin may alternatively be used. The second end portion 1016 of the fastener body 1012 includes a socket 1094.

Figure 11:
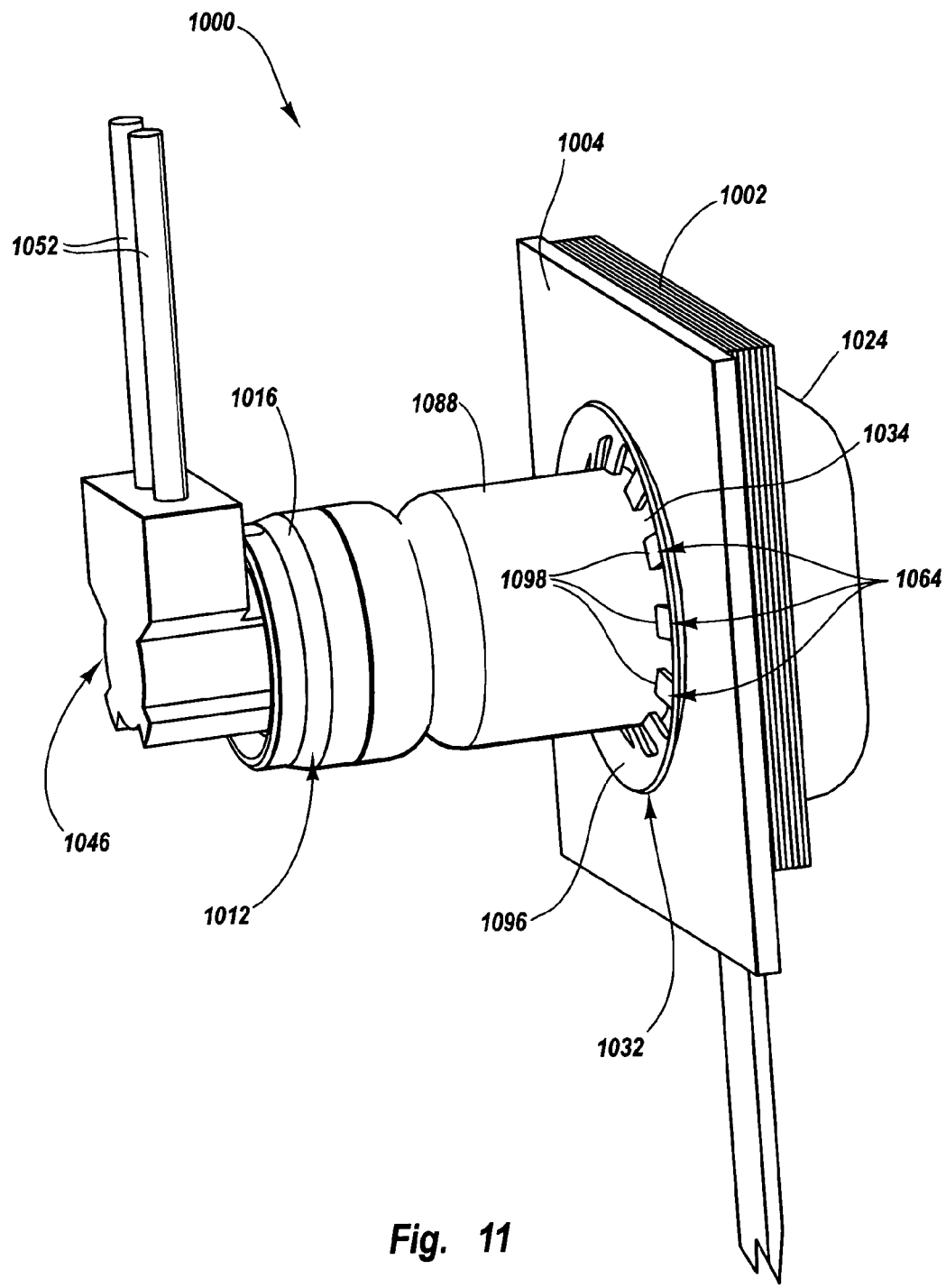
FIG. 11 is a perspective view of the actuatable fastener assembly of FIG. 10 after assembly.

FIG. 11 is a perspective view of the actuatable fastener 1000 of FIG. 10 after assembly. The fastener body 1012 extends through holes in the venting tube 1002 and the airbag housing 1004. As before, the fastener head 1024 is positioned so that the venting tube 1002 is tightly compressed between the fastener head 1024 and the airbag housing 1004.

The retainer 1032 shown in FIG. 11 has a retainer body 1096. A hole 1034 is disposed in the center of the retainer 1032, inward from the peripheral region of the retainer 1032. The diameter of the hole 1034 is slightly larger than the diameter of the fastener body 1012.

As shown, the retainer 1032 is positioned around the fastener body 1012, in abutting relation to the airbag housing 1004. In the illustrated embodiment, the retention features 1064 in the retainer 1032 take the form of a plurality of locking tabs 1064 that protrude from the retainer 1032 away from the fastener head 1024 and at an oblique angle to the retainer body 1096. Each of the locking tabs 1064 includes a distal edge 1098 which frictionally engages an exterior surface of the fastener body 1012, thereby restricting movement of the retainer 1032 away from the fastener head 1024. However, because the locking tabs 1064 point away from the fastener head 1024, the retainer 1032 may be moved, slidably, in a direction toward the fastener head 1024.

The connector 1046 is inserted into the socket 1094 near the second end portion 1016 of the fastener body 1012. The pins 1072 in the initiator 1042 mate with terminals in the connector 1046. The activation wires 1052 extending from the connector 1046 place the initiator 1042 in electronic communication with the activation device.

The operation of the actuatable fastener assembly 1000 shown in FIGS. 10 and 11 will now be described. An activation signal received from the activation device causes the initiator 1042 to discharge. When the initiator 1042 is discharged, pressurized gas and heat is directed into the enclosed volume 1092 between the fastener body 1012 and the fastener head 1024, causing the pressure within this enclosed volume 1092 to increase significantly. In response to this buildup of pressure, the relatively weak connection between the coupling member 1088 and the fastener head 1024 is severed, and the fastener head 1024 separates from the coupling member 1088. However, the relatively strong connection between the coupling member 1088 and the fastener body 1012 remains intact, and the fastener body 1012 remains securely attached to the coupling member 1088.

Figure 12A:
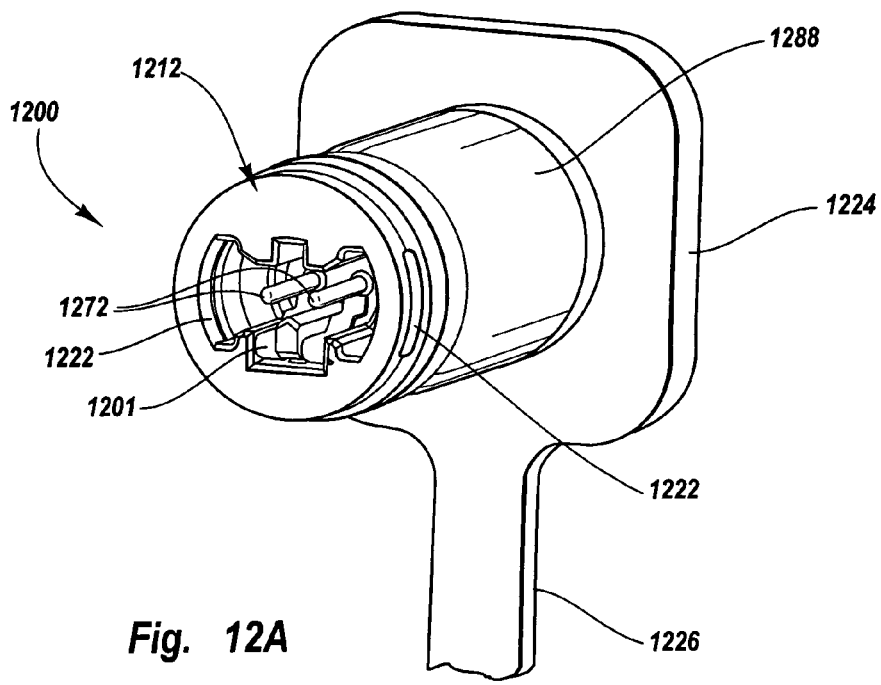
FIG. 12A is a perspective view of another alternative embodiment of an actuatable fastener assembly.
Figure 12B:
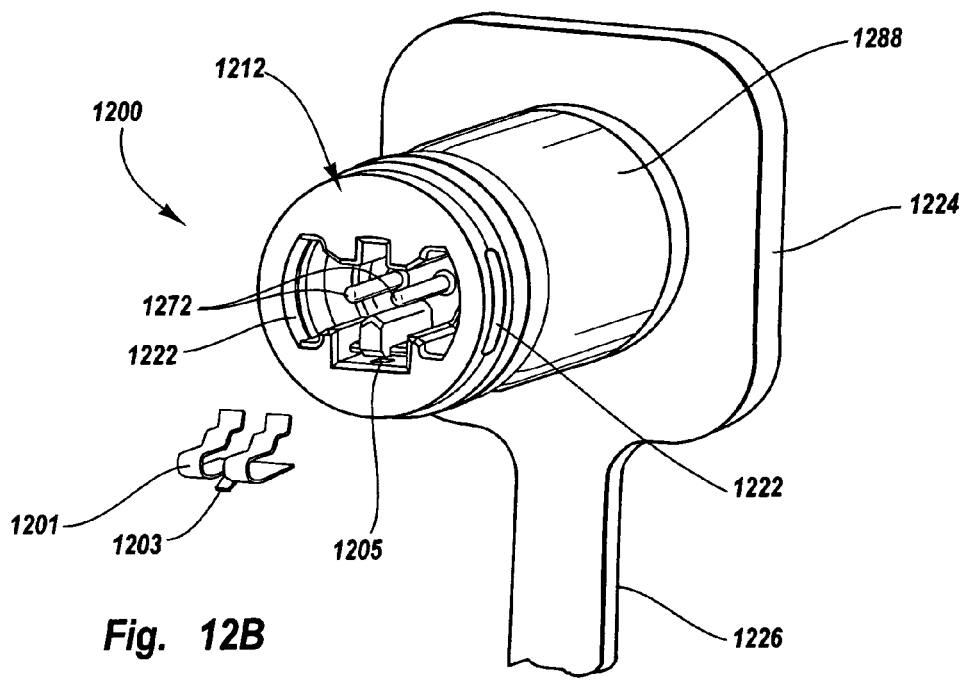
FIG. 12B is an exploded view of the actuatable fastener assembly of FIG. 12A.
Figure 12C:
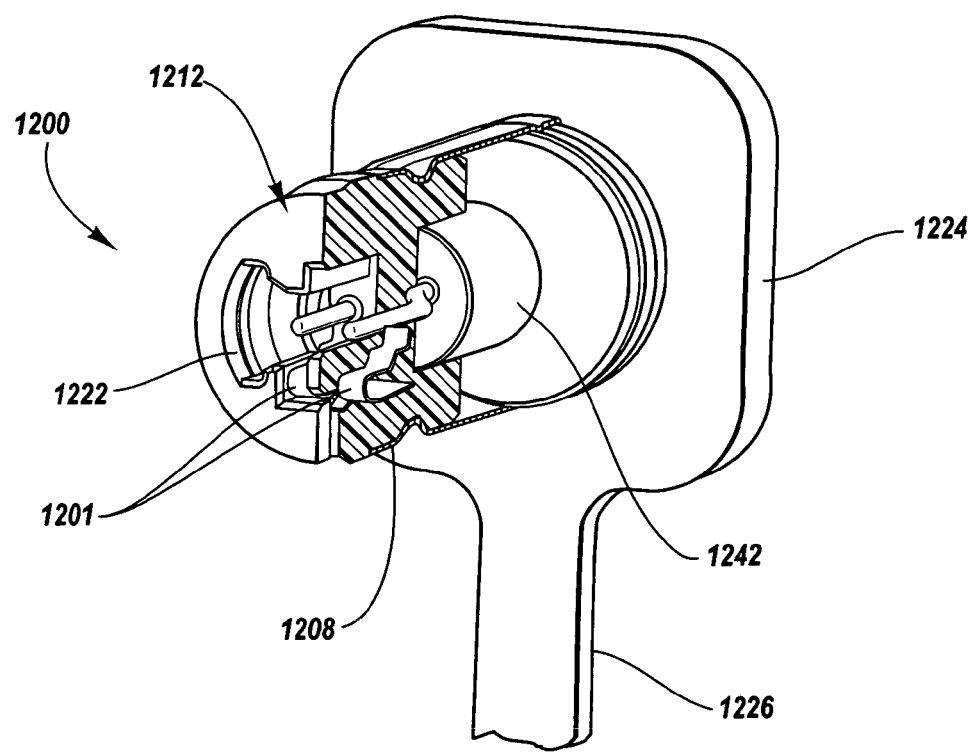
FIG. 12C is a cut-away, perspective view of the actuatable fastener assembly of FIG. 12A.

FIG. 12A is a perspective view of another alternative embodiment of an actuatable fastener assembly 1200. In the illustrated embodiment, a shorting bar 1201 extends from each of the initiator pins 1272. A locking tab 1203, shown in FIG. 12B, extends from one of the shorting bars 1201. The locking tab 1203 extends through a hole 1205 in the fastener body 1212. The shorting bars 1201, the locking tab 1203, and the hole 1205 in the fastener body 1212 are all shown more clearly in the exploded view of FIG. 12B and the cut-away, perspective view of FIG. 12C.

Figure 13:
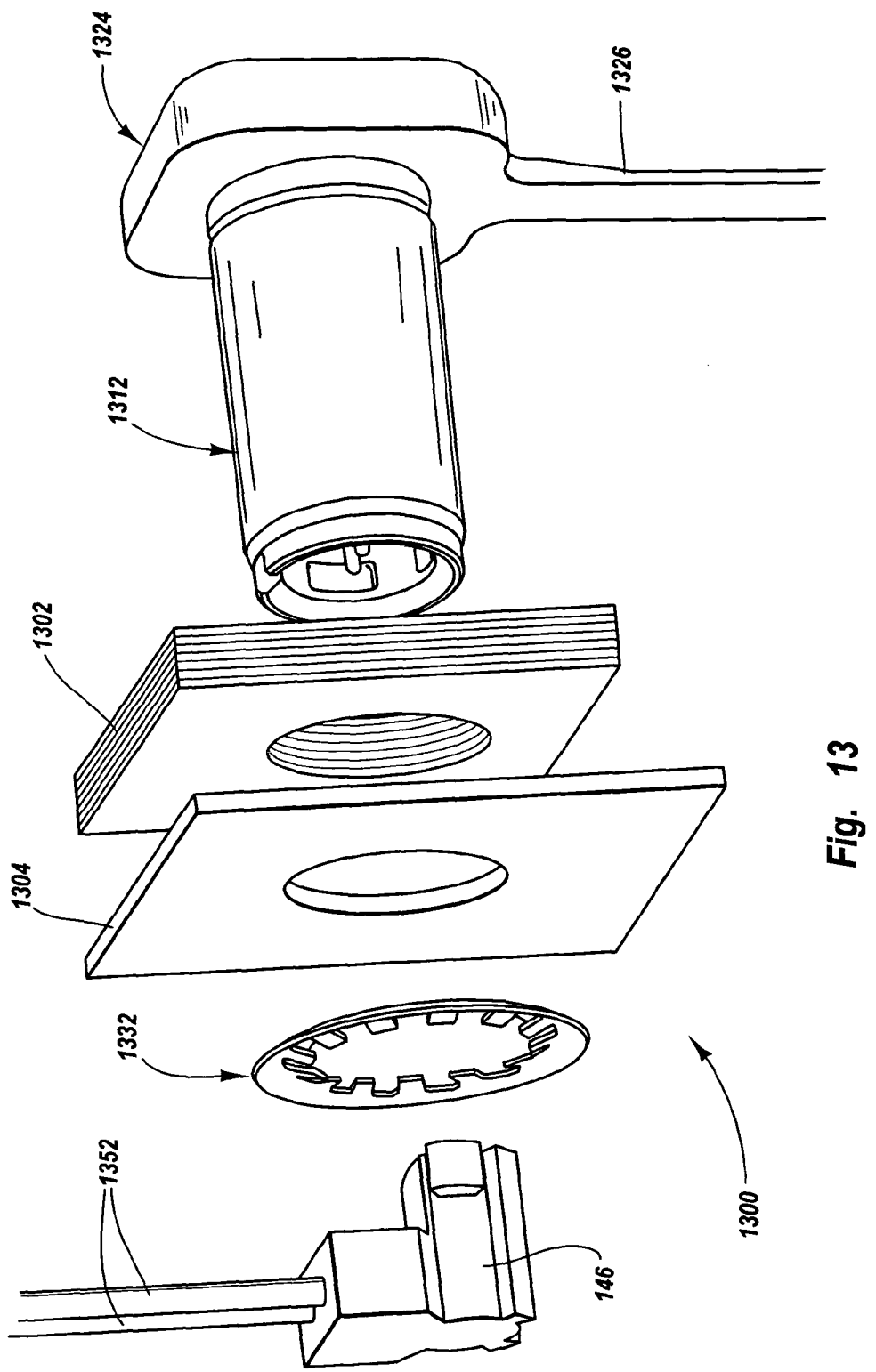
FIG. 13 is an exploded view of another alternative embodiment of an actuatable fastener assembly.

FIG. 13 is an exploded view of an alternative embodiment of the actuatable fastener assembly 1300. In the embodiment shown in FIG. 13, the fastener head 1324 is ultrasonically welded to the fastener body 1312.

Figure 14:
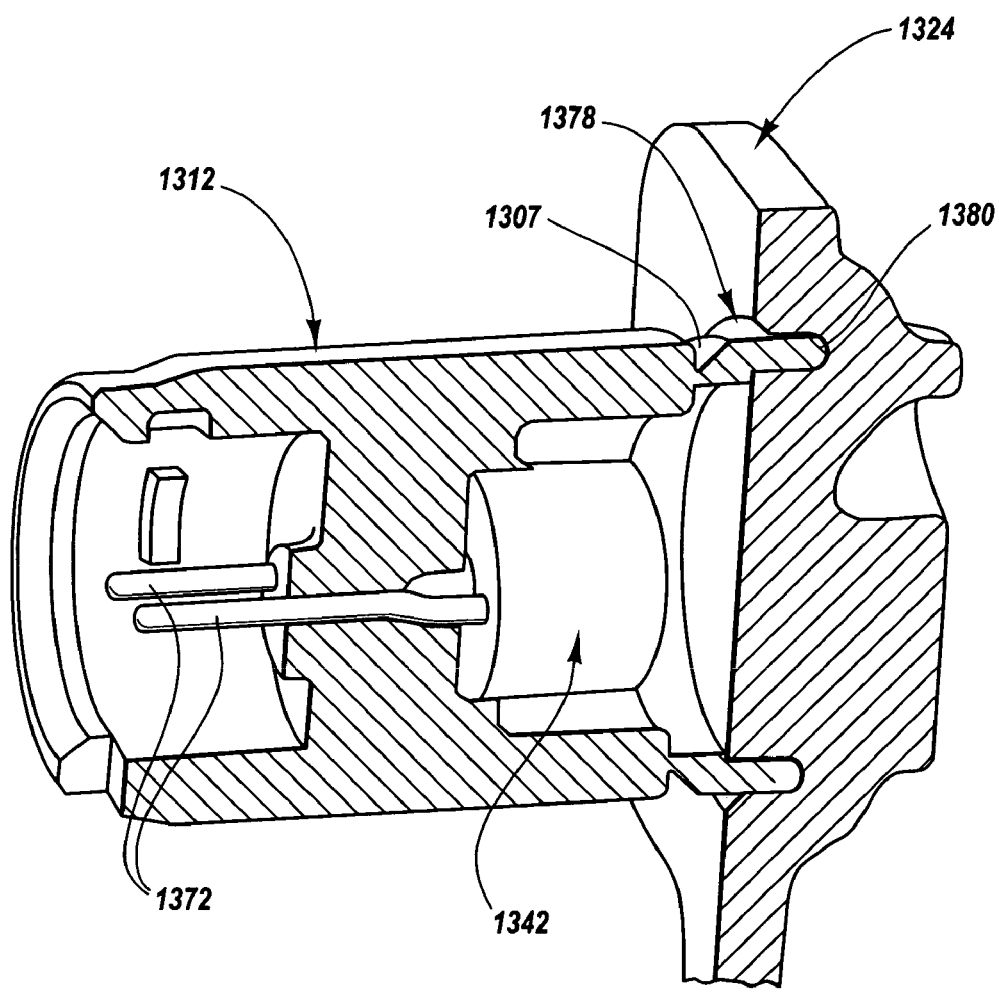
FIG. 14 is a cut-away, perspective view of the actuatable fastener assembly of FIG. 13 showing the fastener head attached to the fastener body.

FIG. 14 is a cut-away, perspective view of the actuatable fastener assembly 1300 of FIG. 13 showing the fastener head 1324 attached to the fastener body 1312. As stated previously, the fastener body 1312 is ultrasonically welded to the fastener head 1324, so that a welded area 1378 exists between the fastener head 1324 and the fastener body 1312. The welded area 1378 is located between a rim 1380 of the fastener body 1312 and the fastener head 1324. A groove 1307 extends through the welded area 1378. The groove 1307 weakens the connection between the fastener body 1312 and the fastener head 1324 so that the fastener head 1324 will more easily separate from the fastener body 1312 upon discharge of the initiator 1342.

Figure 15:
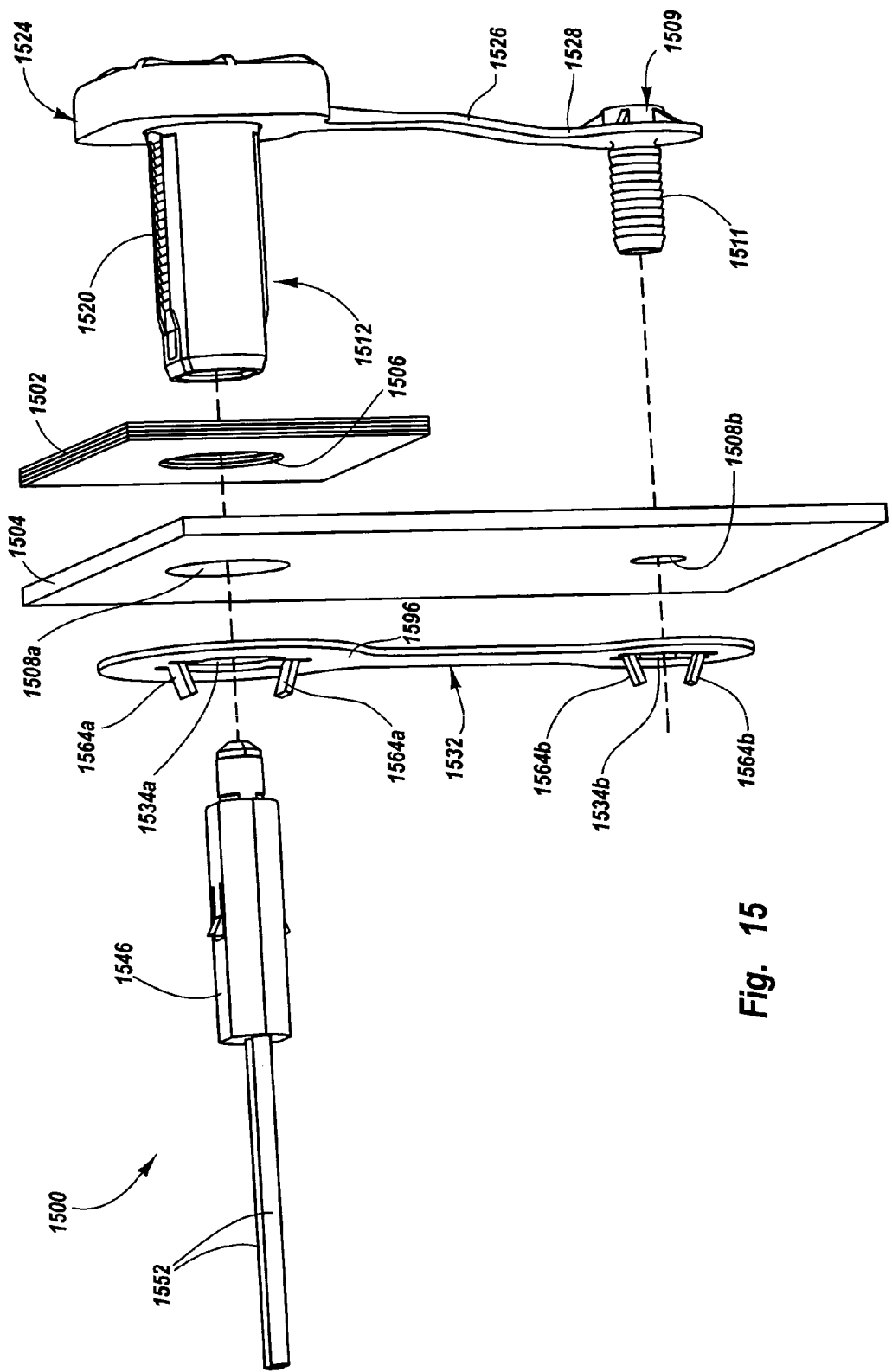
FIG. 15 is an exploded view of another alternative embodiment of an actuatable fastener assembly.

FIG. 15 is an exploded view of another alternative embodiment of an actuatable fastener assembly 1500. In the illustrated embodiment, means are provided for attaching the tether 1526 to the airbag housing 1504 and to the retainer 1532. More specifically, the retainer 1532 is elongated and includes an upper retainer hole 1534a and a lower retainer hole 1534b. The airbag housing 1504 includes an upper housing hole 1508a and a lower housing hole 1508b. The upper retainer hole 1534a, the upper housing hole 1508a, and the venting tube hole 1506 are capable of being aligned with one another, as shown. The lower retainer hole 1534a and the lower housing hole 1508b are also capable of being aligned with one another. A male fastener 1509 is molded onto the end portion 1528 of the tether 1526. The male fastener 1509 includes a plurality of teeth 1511.

The retainer 1532 includes retention features 1564, as before. In particular, a pair of locking tabs 1564a are disposed around the periphery of the upper retainer hole 1534a and another pair of locking tabs 1564b are disposed around the periphery of the lower retainer hole 1534b. These locking tabs 1564 extend from their respective retainer holes 1534 in a direction away from the fastener head 1524 at an oblique angle to the retainer body 1596.

Figure 16:
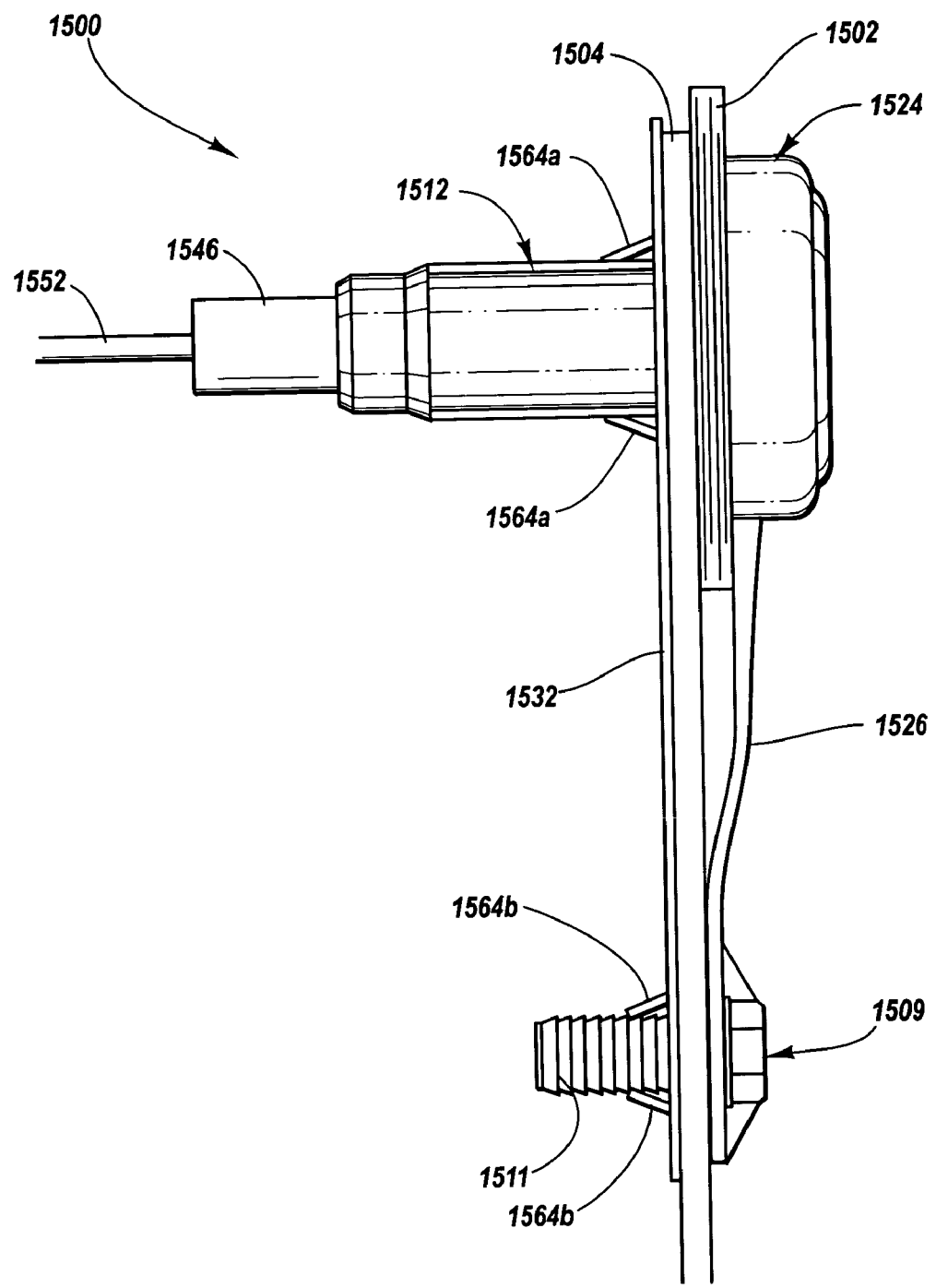
FIG. 16 is a side plan view of the actuatable fastener assembly of FIG. 15.

FIG. 16 is a side plan view of the actuatable fastener assembly 1500 of FIG. 15. The fastener body 1512 extends through the venting tube hole 1506, the upper housing hole 1508a, and the upper retainer hole 1534a. The male fastener 1509 extends through the lower housing hole 1508b and the lower retainer hole 1534b. The upper locking tabs 1564a engage the locking teeth 1520 on the exterior surface of the fastener body 1512 to prevent movement of the fastener head 1524 away from the retainer 1532, and vice versa. The lower locking tabs 1564b engage the teeth 1511 on the male fastener 1509. In this way, the tether 1526 (and therefore the fastener head 1524) will remain attached to the airbag housing 1504, even after discharge of the initiator.

Figure 17:
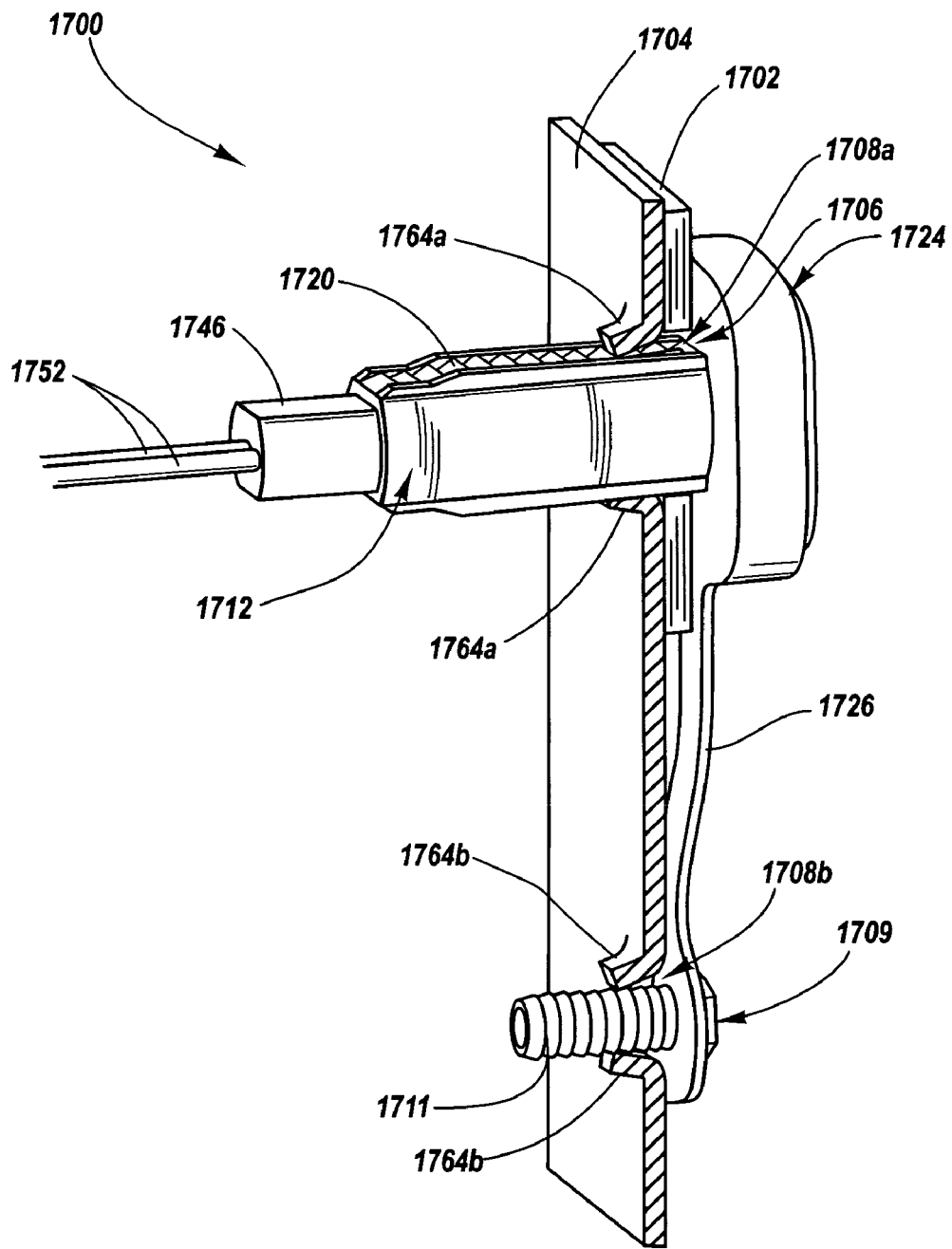
FIG. 17 is a cut-away, perspective view of another alternative embodiment of an actuatable fastener assembly.

FIG. 17 is a cut-away, perspective view of another alternative embodiment of an actuatable fastener assembly 1700. In the illustrated embodiment, the airbag housing 1704 functions as a retainer. More specifically, the airbag housing 1704 includes retention features 1764 that resist movement of the fastener head 1724 away from the airbag housing 1704, and vice versa. The retention features 1764 are a pair of locking tabs 1764a disposed around the periphery of the upper housing hole 1708a and another pair of locking tabs 1764b disposed around the periphery of the lower housing hole 1708b. These locking tabs 1764 may be stamped into the airbag housing 1704.

The fastener body 1712 extends through the venting tube hole 1706 and the upper housing hole 1708a. The male fastener 1709 extends through the lower housing hole 1708b. The upper locking tabs 1764a engage the locking teeth 1720 on the exterior surface of the fastener body 1712 to prevent movement of the fastener head 1724 away from the airbag housing 1704, and vice versa. The lower locking tabs 1764b engage the teeth 1711 on the male fastener 1709 to attach the airbag housing 1704 to the tether 1726.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An actuatable fastener assembly, comprising:
   a fastener body;
   a fastener head attached to the fastener body;
   an initiator embedded within the fastener body, wherein activation of the initiator causes the fastener head to separate from the fastener body; and
   a retainer that is slidably movable along the fastener body toward the fastener head, wherein the retainer comprises a retention feature that resists movement of the retainer away from the fastener head, wherein the retainer locks the fastener assembly in place.

2. The actuatable fastener assembly of claim 1, wherein the retention feature is a first plurality of locking teeth, and wherein the first plurality of locking teeth resist movement of the retainer away from the fastener head by engaging a second plurality of locking teeth positioned on an exterior surface of the fastener body.

3. The actuatable fastener assembly of claim 1, wherein the retention feature is a locking tab that points away from the fastener head.

4. The actuatable fastener assembly of claim 3, wherein the locking tab resists movement of the retainer away from the fastener head by engaging one of a plurality of locking teeth positioned on an exterior surface of the fastener body.

5. The actuatable fastener assembly of claim 3, wherein the locking tab resists movement of the retainer away from the fastener head by frictionally engaging an exterior surface of the fastener body.

6. The actuatable fastener assembly of claim 1, wherein an exterior surface of the fastener body comprises a first plurality of locking teeth and a second plurality of locking teeth, wherein the first plurality of locking teeth are offset from the second plurality of locking teeth, and wherein the retention feature resists movement of the retainer away from the fastener head by engaging at least one of the first plurality of locking teeth and the second plurality of locking teeth.

7. The actuatable fastener assembly of claim 1, wherein the initiator comprises at least one pin, and further comprising a connector positioned within the fastener body so that terminals in the connector mate with the at least one pin.

8. The actuatable fastener assembly of claim 7, wherein the fastener body comprises a retention pocket, and wherein the connector comprises a locking tab that secures the connector to the fastener body by snapping into the retention pocket.

9. The actuatable fastener assembly of claim 1, further comprising:
   a retaining ring attached to the fastener body; and
   a connector attached to the retaining ring.

10. The actuatable fastener assembly of claim 9, wherein the retaining ring comprises a plurality of radially disposed splines, wherein an interior portion of the connector comprises a plurality of radially disposed ribs, and wherein the splines interact with the ribs to prevent rotation of the retaining ring relative to the connector.

11. The actuatable fastener assembly of claim 10, wherein the connector comprises a locking tab, and wherein the splines interfere with the locking tab to prevent movement of the connector away from the fastener head.

12. The actuatable fastener assembly of claim 1, further comprising a tether attached to the fastener head.

13. The actuatable fastener assembly of claim 12, wherein the tether is attachable to the retainer.

14. The actuatable fastener assembly of claim 12, wherein the fastener head, the retainer, and the tether are formed as a single unit.

15. The actuatable fastener assembly of claim 1, wherein the fastener head is directly attached to the fastener body.

16. The actuatable fastener assembly of claim 15, wherein the fastener head snaps into the fastener body.

17. The actuatable fastener assembly of claim 15, wherein the fastener head is ultrasonically welded to the fastener body.

18. The actuatable fastener assembly of claim 17, further comprising a groove extending through a welded area between the fastener head and the fastener body.

19. The actuatable fastener assembly of claim 1, wherein a coupling member attaches the fastener head to the fastener body.

20. The actuatable fastener assembly of claim 19, wherein a first connection between the fastener head and the coupling member is more easily severed than a second connection between the fastener body and the coupling member.

21. The actuatable fastener assembly of claim 1, wherein the fastener body has a length, wherein a bore extends along the length of the fastener body, and wherein the initiator is held in place by means of a press-fit between the bore and the initiator.

22. The actuatable fastener assembly of claim 1, wherein the fastener body is manufactured with the initiator in place.

23. The actuatable fastener assembly of claim 1, wherein the initiator comprises at least one initiator pin, and further comprising a shorting bar extending from the at least one initiator pin.

24. An actuatable fastener assembly, comprising:
a fastener body;
a fastener head attached to the fastener body;
means for causing the fastener head to separate from the fastener body upon receipt of an activation signal; and
a retainer that is slidably movable along the length of the fastener body toward the fastener head; and
means for restricting movement of the retainer along the length of the fastener body away from the fastener head, wherein the retainer locks the fastener assembly in place.

25. The actuatable fastener assembly of claim 24, further comprising means for attaching a connector to the fastener body.

26. The actuatable fastener assembly of claim 24, further comprising means for attaching the fastener head to the retainer.

* * * * *